United States Patent [19]
Parker

[11] Patent Number: 5,906,751
[45] Date of Patent: May 25, 1999

[54] FILTERING APPARATUS WITH IMPROVED QUICK-OPENING BACKWASH VALVE

[76] Inventor: Leland L. Parker, 1018 W. Ontario St., Corona, Calif. 91718

[21] Appl. No.: 08/948,619

[22] Filed: Oct. 10, 1997

[51] Int. Cl.⁶ .................................................. B01D 37/04
[52] U.S. Cl. .......................... 210/741; 210/791; 210/798; 210/108; 210/411; 210/412; 210/425; 137/109; 137/493
[58] Field of Search .................................... 210/797, 741, 210/798, 791, 108, 130, 133, 136, 278, 411, 412, 424, 425; 137/109, 110, 493

[56] References Cited

U.S. PATENT DOCUMENTS

| | | | |
|---|---|---|---|
| 3,888,280 | 6/1975 | Tartaglia | 137/630.13 |
| 3,908,693 | 9/1975 | Cooper | 210/130 |
| 4,055,500 | 10/1977 | Parker . | |
| 4,477,343 | 10/1984 | Tucker | 210/108 |
| 4,614,581 | 9/1986 | Drori | 210/108 |
| 4,936,989 | 6/1990 | Walker | 210/411 |
| 5,129,419 | 7/1992 | Stapleton | 137/514.3 |

*Primary Examiner*—Robert J. Popovics
*Attorney, Agent, or Firm*—Sheldon & Mak; Denton L. Anderson

[57] ABSTRACT

A filtering apparatus is provided wherein the filter can be backwashed by an explosive-like surge of backwashing fluid. The backwashing assembly includes a quick-opening backwash valve which is not actuated by a linearly-acting valve stem disposed on the outlet side of the valve. In a typical embodiment, the inlet valve to the filtering apparatus is a rotating butterfly valve and the backwash valve is physically attached to the inlet valve, such that, when the inlet valve is open, the backwash valve is fully-closed and when the inlet valve is moved towards its fully-closed position, the backwash valve is fully-opened. The invention uses a two-step method of initially applying biasing pressure on the inlet valve/backwash valve combination and to thereafter provide additional pressure to dislodge the backwash valve from the valve seat—whereupon the backwash valve quickly opens and an explosive-like surge of backwashing fluid effectively backwashes the filtering media. Because the backwash valve is a non-outlet side linearly actuated valve, the discharge pipe running away from the backwash valve need not have any abrupt bends, so the explosive-like surge is maximized.

12 Claims, 6 Drawing Sheets

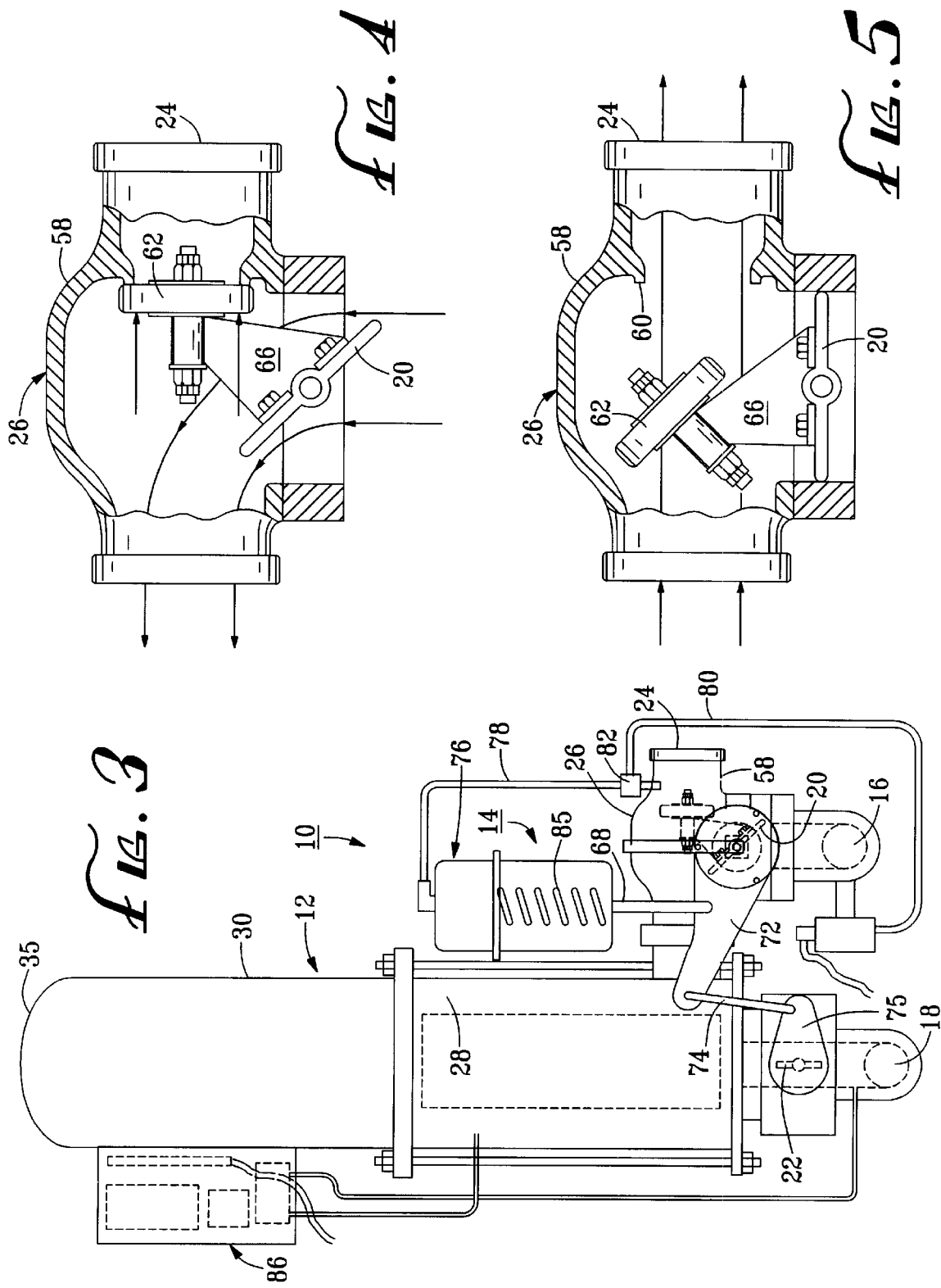

FILTERING APPARATUS WITH IMPROVED QUICK-OPENING BACKWASH VALVE

FIELD OF THE INVENTION

This invention relates generally to filtering apparatus and, more particularly, to filtering apparatus having built-in backwashing systems.

BACKGROUND

Heretofore, it has been generally been known to provide filtering apparatus in which the filter unit is arranged to be connected for normal filtering flow of the fluid to be filtered in one direction through the filter, and periodically reverse the direction of flow through the filter to remove the accumulated filtered out material. In many installations, the reverse flow or backwashing procedure, as previously practiced, is not entirely satisfactory for the reason that much of the filtered out material becomes lodged in the filter and is not effectively removed by the usual reversed flow or backwashing process.

In U.S. Pat. No. 4,055,500, I disclosed a unique filtering apparatus having a backwashing system capable of initiating a backwashing flow with an explosive-like initial surge of backwashing fluids. The explosive-like surge of the backwashing fluid is accomplished using a quick-opening valve, actuated by a linearly traveling valve stem disposed on the outlet side of the valve. Such filtering apparatus has been found to be considerably more efficient than filtering apparatus of the prior art due to the increased efficiency of the backwashing operation using the explosive-like initial surge of backwashing fluids.

Although the filtering system disclosed in U.S. Pat. No. 4,055,500 has been found to be considerably more efficient than filtering systems of the prior art, the filtering system disclosed in U.S. Pat. No. 4,055,500 is not as efficient as it might otherwise be. This is because that system requires backwashing fluids to exit the filtering system via an outlet line having at least one 90°. This bend is necessary in the filtering system disclosed in U.S. Pat. No. 4,055,500 because of the construction of the quick-opening valve, actuated by a valve stem traveling linearly from the outlet side of the valve. Such 90° bend has been found to significantly increase the pressure drop of the surging backwashing fluids, and consequently, significantly reduce the efficiency of the backwashing operation.

Accordingly, there is a need for a filtering apparatus of the type disclosed in U.S. Pat. No. 4,055,500 which does not require a 90° bend in the backwashing outlet line.

SUMMARY

The invention satisfies this need. The invention is a filtering apparatus of the type comprising: (i) a filter having an inlet for a pressurized fluid to be filtered, and an outlet for the filtered fluid; (ii) an inlet valve and an outlet valve respectively for said filter inlet and said filter outlet each capable of cycling between an open position and a fully-closed position; (iii) means providing a reversed flow backwash connection through the filter from a source of pressurized filtered fluid to a point of discharge, when said inlet and outlet valves are closed; and (iv) a non-outlet side backwash valve in said reversed flow connection normally urged by fluid pressure to a closed position and having actuator means operable to effect a quick opening of the valve whereby to produce an explosive surge in the backwash flow to dislodge accumulated filtered material in the filter. The improvement provided by the invention is that the backwash valve is a non-outlet side linearly actuated valve.

Preferably, the backwash valve is a non-linearly actuated valve, i.e., one which opens by rotating the valve away from the valve seat or by some other non-linear path.

In a typical embodiment, the filtering apparatus inlet valve is a butterfly valve and the backwash valve is physically attached to the butterfly valve, such that, as the butterfly valve is rotated towards the closed position, the backwash valve is rotated to an open position.

In operation, the backwash valve of such an embodiment can be quickly opened in a two-step operation. In the first step, pressure is applied to the butterfly valve by a torsional spring or other biasing means. Such pressure, however, is less than the fluid pressure holding the backwash valve closed. In a second step, additional pressure is applied to the butterfly valve sufficient to overcome the fluid pressure against the backwash valve. Such additional pressure rotates the butterfly valve towards the closed position and, in so doing, initially opens the backwash valve. The sudden release of fluid pressure against the backwash valve allows the biasing means to quickly close the butterfly valve and quickly open the backwashing valve, thereby initiating an explosive-like surge of backwashing fluid through the open backwash valve.

DRAWINGS

These features, aspects and advantages of the present invention will become better understood with regard to the following description, appended claims and accompanying figures where:

FIG. 3 is a side view of the filtering apparatus illustrated in FIGS. 1 and 2;

FIG. 4 is a cross-sectional side view of a quick opening valve useful in the invention, showing the backwash valve in the closed position;

FIG. 5 is a cross-sectional side view of the quick opening valve illustrated in FIG. 4, showing the backwash valve in the open position;

DETAILED DESCRIPTION

Figure 1:
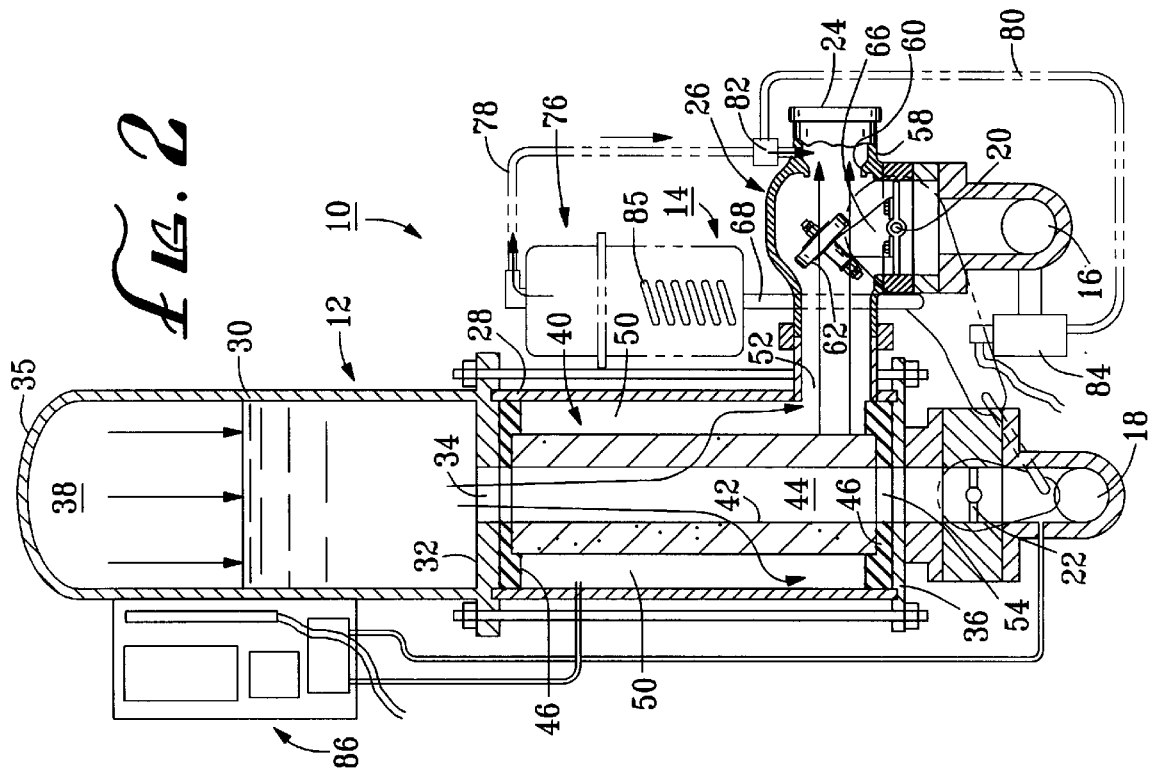
FIG. 1 is a cross-sectional side view of a filtering apparatus having features of the invention, showing the backwash valve in the closed position.

The following discussion describes in detail one embodiment of the invention and several variations of that embodiment. This discussion should not be construed, however, as limiting the invention to those particular embodiments. Practitioners skilled in the art will recognize numerous other embodiments as well.

The invention 10 comprises a filter unit 12 and a backwashing system 14 for the filter unit 12. As illustrated in the drawings, the filter unit 12 has an inlet 16 for pressurized fluid to be filtered and an outlet 18 for the filtered fluid. An inlet valve 20 is disposed across the inlet 16 and an outlet valve 22 is disposed across the outlet 18. Both the inlet valve 20 and the outlet valve 22 are capable of cycling between an open position and a fully-closed position.

The backwashing system 14 comprises a backwash outlet connection 24 to allow a flow of reversed backwashing fluids from a source of pressurized filtered fluid to a discharge zone (not shown).

The backwashing system 14 further comprises a backwash valve 26 which is capable of quickly opening to produce an explosive surge of backwashing fluids to dislodge accumulated filtered matter and to flush such matter out through the backwash outlet connection 24 to the discharge zone. As discussed in detail below, the backwash valve 26 is a non-outlet side linearly actuated valve.

Figure 2:
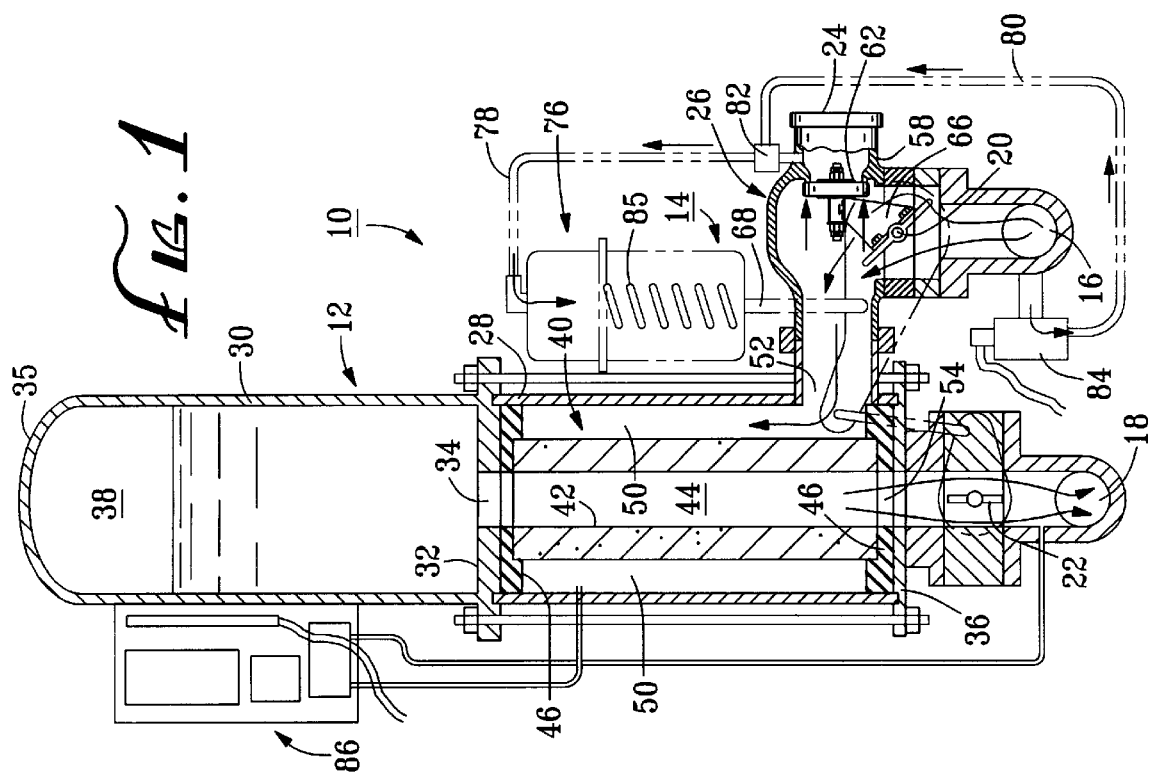
FIG. 2 is a cross-sectional side view of the filtering apparatus illustrated in FIG. 1, showing the backwash valve in the open position.
Figure 6:
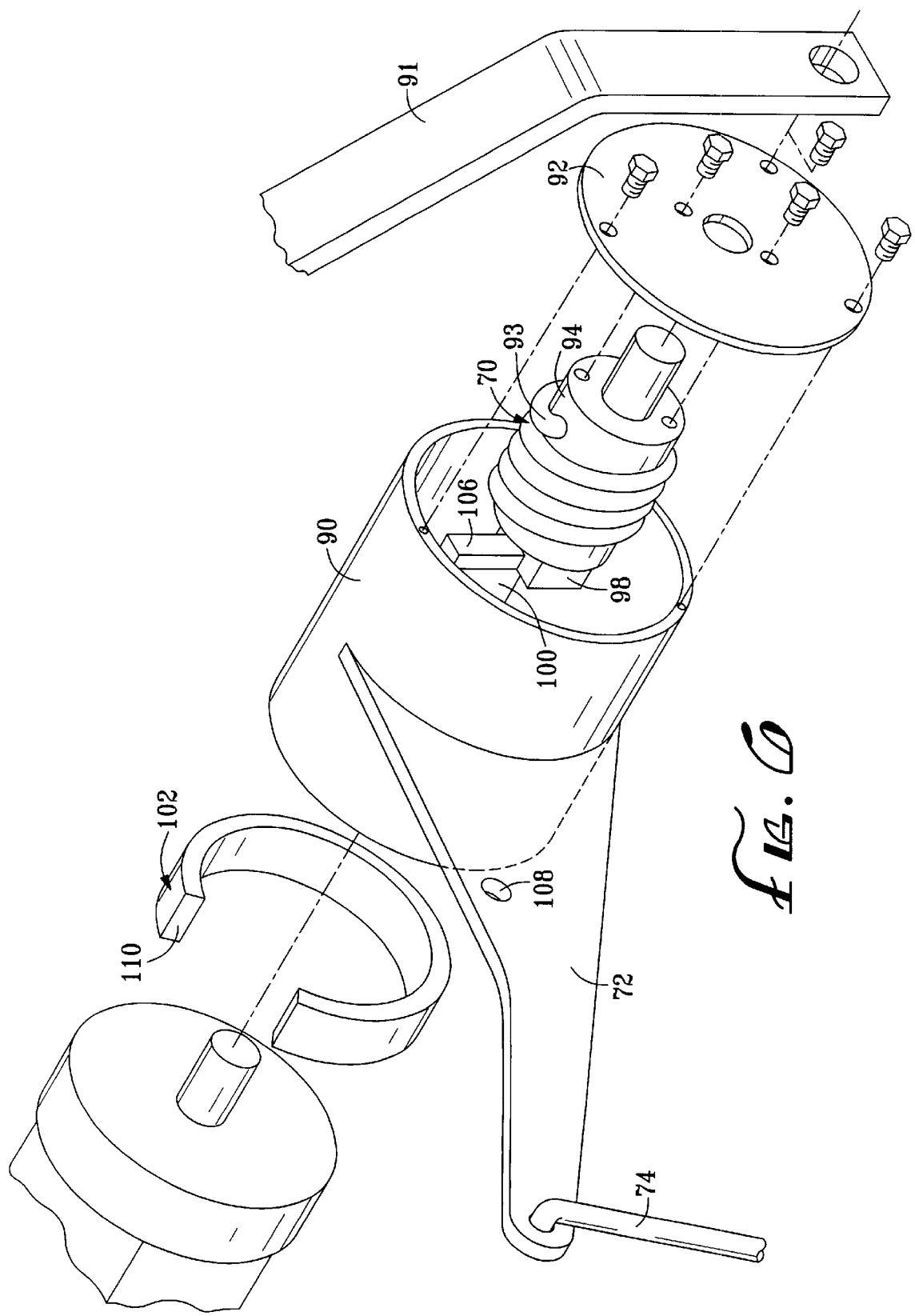
FIG. 6 is an exploded perspective view of actuating equipment useful in the invention.
Figure 7:
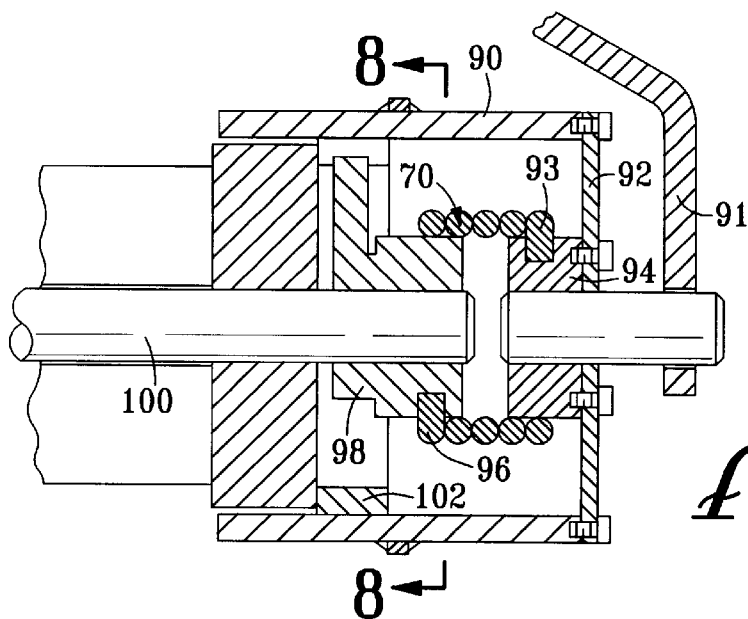
FIG. 7 is a cross-sectional side view showing actuation equipment useful in the invention.

Referring more specifically to FIGS. 1 and 2, the filter unit 12 and the backwashing system 14 are assembled and interconnected into a compact operative assemblage. The filter unit 12 and the backwashing system 14 unit may be constructed of any suitable materials, such as metal or plastic, may be interconnected by various means, may assume various configurations, and are not to be limited to the particular materials, connection means or configurations illustrated herein.

In the embodiment illustrated in the drawings, the filter unit 12 is shown as comprising a lower cylindrical housing 28 and an axially aligned upper cylindrical housing 30. These housings 28 and 30 have their inner adjacent ends closed by a common separating wall 32 having a central communicating opening 34. The upper end of the upper cylindrical housing 30 is closed by a first end wall 35, and the lower end of the lower cylindrical housing 28 is closed by a second end wall 36. As thus arranged, the upper cylindrical housing 30 forms a closed reservoir or chamber 38, except for the communicating opening 34.

The lower cylindrical housing 28 forms a filter chamber 40 arranged to house an appropriate filter cartridge 42. The filter cartridge 42 is fabricated from suitable filtering media and is typically shaped to provide an elongated tubular structure having an axial bore 44 extending between its ends. The respective ends of the filter cartridge 42 are sealed with respect to their adjacent wall structure by means of appropriate annular sealing disks 46 which are provided in each case with a circumferentially extending grooved sealing flange which overlaps the associated end of the filter cartridge 42 and extends into an annular space 50. The annular space 50 extends between the inner surface of the lower cylindrical housing 28 and the outer surface of the filter cartridge 42. The annular space 50 is in communication with a flow port 52 which constitutes the inlet for the fluid to be filtered. The axial bore 44 of the filter cartridge 42 has its uppermost end in communication with the closed chamber 38 through the communicating opening 34, and has its lowermost end in communication by means of a central opening 54 in the lower end wall 36 which constitutes the filter outlet 18.

The backwash valve 26 is a quick opening valve having a valve body 58 defining a valve seat 60 and a movable valve member 62 which can be alternatively moved (i) into a sealing relationship with the valve seat 60 and (ii) into a non-sealing relationship away from the valve seat 60. The backwash valve 26 is supported on one side of the filter unit 12 and is typically fabricated of metal, plastic or other suitable material. In the embodiment illustrated in the drawing, the backwash valve body 58 further houses the inlet valve 20.

Figure 11A:
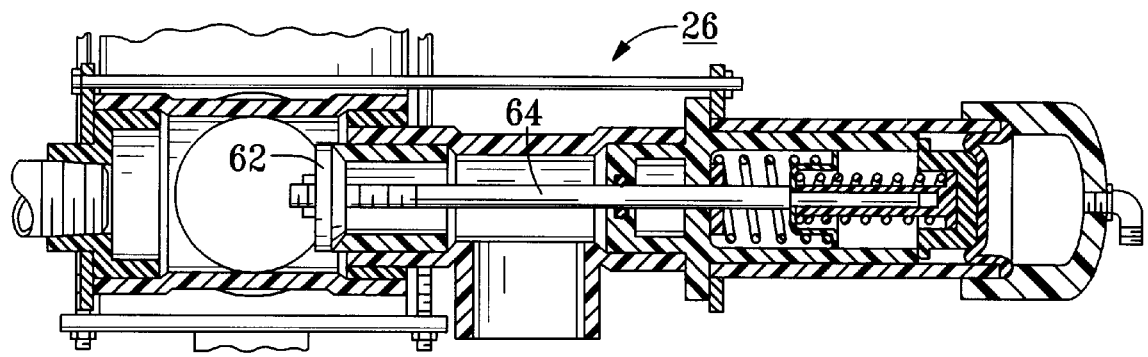
FIG. 11A is a cross-sectional side view of an outlet side linearly actuated valve showing the valve in the closed position.
Figure 11B:
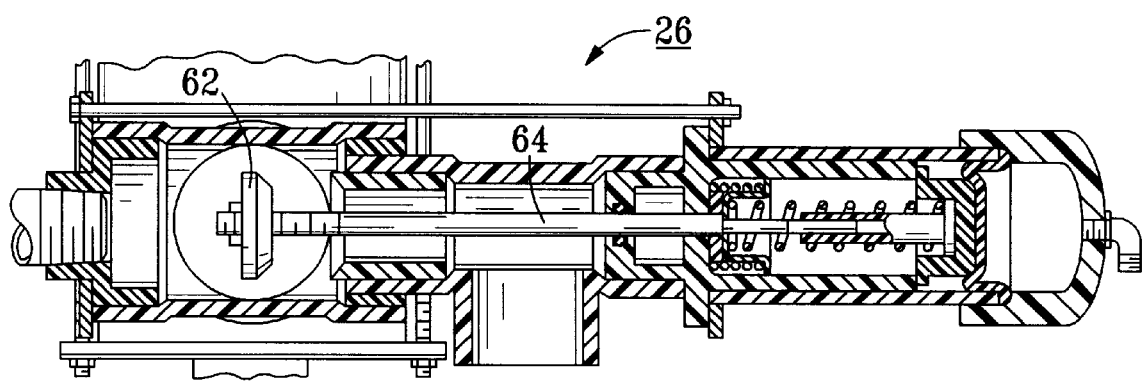
FIG. 11B is a cross-sectional side view of the valve shown in FIG. 11A but showing the valve in the open position.
Figure 12A:
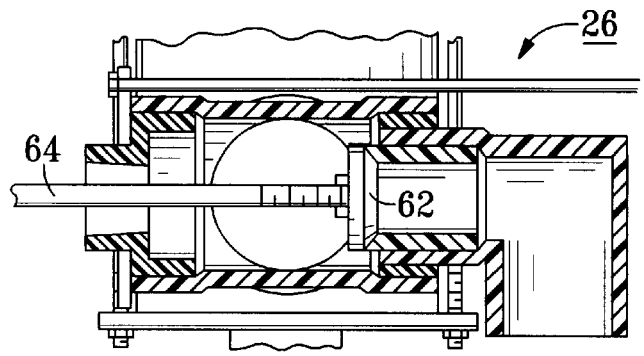
FIG. 12A is a cross-sectional side view of a non-outlet side linearly actuated valve useful in the invention showing the valve in the closed position.
Figure 12B:
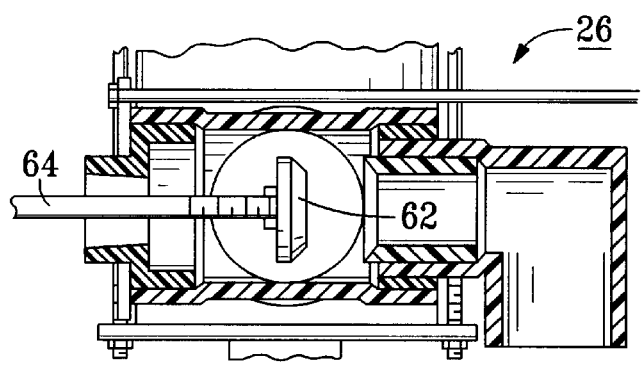
FIG. 12B is a cross-sectional side view of the valve shown in FIG. 12A but showing the valve in the open position.

A critical feature of the invention 10 is that the backwash valve 26 is a non-outlet side linearly actuated valve. By "non-outlet side linearly actuated valve," it is meant that the valve member 62 is not moved to and from the valve seat 60 by a valve stem 64 which travels in a linear direction along a path disposed on the outlet side of the valve member 62. This distinction can be readily understood from FIGS. 11–13, wherein the valve in FIGS. 11A and 11B is an outlet side linearly actuated valve and wherein the valves shown in FIGS. 12A, 12B, 13A and 13B are non-outlet side linearly actuated valves.

Figure 13A:
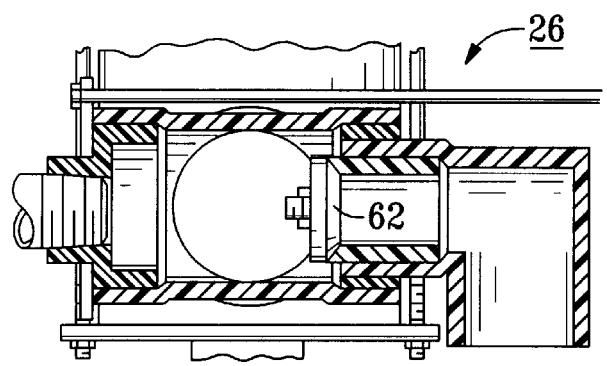
FIG. 13A is a cross-sectional side view of a non-linearly actuated valve useful in the invention showing the valve in the closed position.
Figure 13B:
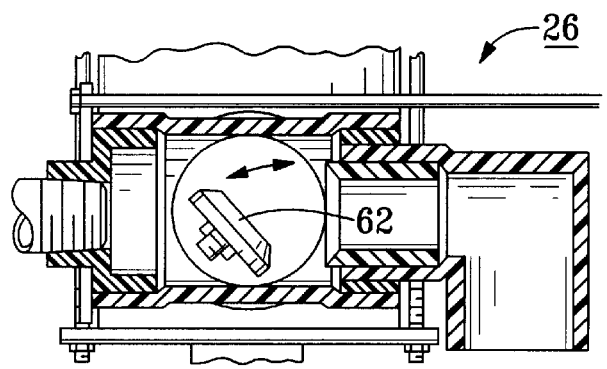
FIG. 13B is a cross-sectional view of the valve shown in FIG. 13A but showing the valve in the open position.

Preferably, the backwash valve 26 is a non-linearly actuated valve. By "non-linearly actuated valve," it is meant a valve wherein the valve member 62 moves away from the valve seat 60 along a non-linear path. Such a non-linearly actuated valve is illustrated in FIGS. 13A and 13B, as well as in FIGS. 1, 2, 4 and 5.

In the embodiment illustrated in the drawings, the valve member 62 of the backwash valve 26 is physically attached to the inlet valve 20, such that, when the inlet valve 20 is moved from an open position to a fully-closed position, the backwash valve 26 is moved from a fully-closed position to an open position. This is possible because the inlet valve 20 is a rotating valve, such as a butterfly valve (as illustrated in the drawings) or a ball valve. The term "rotating valve" as used herein is meant to denote a valve wherein the valve member is alternatively moved from a fully-closed position to a fully-pen position by rotating the valve member, typically by about 90°.

In the embodiment shown in the drawings, the valve member 62 of the backwash valve 26 is physically attached to the inlet valve 20 by a plate 66. By this construction, the backwash valve 26 can be fully-closed when the inlet valve 20 is opened (as illustrated in FIG. 4), but, when the inlet valve 20 is fully-closed, the backwash valve 26 is opened (as illustrated in FIG. 5).

As illustrated in FIG. 1, under "normal" operation, the filter unit 12 of the invention 10 can filter a liquid fluid by passing the fluid through the inlet valve 20, through the backwash valve body 58, through the filter cartridge 42 and out through the outlet 18 via the outlet valve 22. Material filtered out of the fluid is trapped within the filter cartridge 42. During normal operation, a reservoir of filtered fluid is trapped within the reservoir 38. The fluid within the reservoir 38 is pressurized by air pressure trapped at the top of the reservoir 38.

During normal filtering operation, such as illustrated in FIG. 1, the backwash valve 26 is maintained tightly sealed against the valve seat 60 of the backwash within they fluid pressure within the backwash valve body 58.

As illustrated in FIG. 2, during backwashing operation, both the inlet valve 20 and the outlet valves 22 are closed and the backwash valve 26 is opened. In this configuration, pressurized fluid within the reservoir 38 is caused to flow backwards through the filter cartridge 42 to dislodge filtered material from the filter cartridge 42 and flush such material out of the filter unit 12 through the backwash valve 26 to the discharge zone.

The backwashing operation is initiated by actuator means which comprises an actuation member 68 and interconnecting means for interconnecting the actuation member 68 and the backwash valve member 62. In the embodiment illustrated in the drawings, such interconnecting means comprises a spring 70 compressible in response to a predetermined initial movement of the actuation member 68 and means operative at the end of the initial movement to establish a direct connection with the backwash valve member 62, whereby further movement of the actuation member 68 (after the initial movement) operates to initially unseat the backwash valve member 62 and permit the spring 70 to quickly move the backwash valve member 62 to its fully-open position.

In the embodiment illustrated in the drawings, the spring 70 is a torsional spring. Preferably, the actuation member 68 is further connected to the outlet valve 22, such that the initial movement of the actuation member 68 causes the outlet valve 22 to go to its fully-closed position. In the embodiment illustrated in the drawings, such connection to the outlet valve 22 is provided by a first actuation arm 72, a link rod 74 and a second actuation arm 75 which are assembled to one another such that movement of the first actuation arm 72 (counter-clockwise in the drawings) causes the link rod 74 to rotate the second actuation arm 75 so as to rotate the outlet valve 22 to its fully-closed position.

Also in the embodiment illustrated in the drawings, the actuation member 68 is driven by a hydraulic actuator 76 capable of periodically applying a pressurized fluid to the actuation member 68 so as to move the actuation member 68. The pressurized fluid, typically pressurized water, is provided to the hydraulic actuator 76 via a first Hydraulic line 78 and a second hydraulic line 80. The first hydraulic line 78 is disposed in fluid tight communication with the actuator 76 and the second hydraulic line 80 is disposed in fluid tight communication with a source of pressurized fluid (not shown). A three-way valve 82 is provided which is capable of alternatively interconnecting (i) the first hydraulic line in fluid tight communication with the second Hydraulic line 80, and (ii) the first hydraulic line 78 in fluid tight communication with an exhaust zone, such that the actuator 76 can be filled with pressurized fluid by opening a block valve 84, such as a solenoid valve, and directing pressurized fluids from the second hydraulic line 80 to the first hydraulic line 78 via the three-way valve 82, and such that pressurized fluid can thereafter be drained from the actuator 76 to the exhaust zone through the first hydraulic line 78 via the three-way valve 82 In the embodiment shown in the drawings, the exhaust zone is the discharge opening immediately downstream of the backwash valve 26.

As shown in the drawings, an actuator spring 85 urges the actuation member 68 to its upper-most position, whereas pressured fluid within the actuator 76 urges the actuation member 68 downwardly against the biasing pressure provided by the actuator spring 85.

As illustrated in FIGS. 3–10, the torsional spring 70 is directly connected to the inlet valve 20. The spring 70 is disposed within a rotatable housing 90 to which is attached the first actuation arm 72. The housing includes an end plate 90. The housing 90 is rotatably attached to a stationary brace 91. A first end 93 of the spring 70 is attached to a first block 94 which is affixed to the end plate 92. Accordingly, rotation of the housing 90, including the end plate 92, rotates the first end 93 of the spring 70. The second end 96 of the spring 70 is attached to a second block 98 which is affixed to a connection rod 100. The connection rod 100 is directly connected to the inlet valve 20. The connection rod 100 is rotatable so that rotation of the second end 96 of the spring 70 causes rotation of the inlet valve 20. Affixed along the inner surface of the housing 90 is a C-ring 102. Disposed within the open section 104 of the C-ring 102 is a contact heel 106 affixed to the second block 98.

Figure 8:
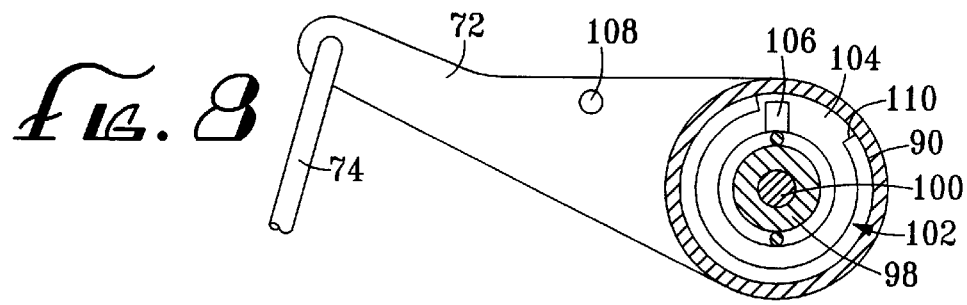
FIG. 8 is a side view, in partial cross-section, of actuation equipment illustrated in FIG. 7, taken along line 8—8.
Figure 9:
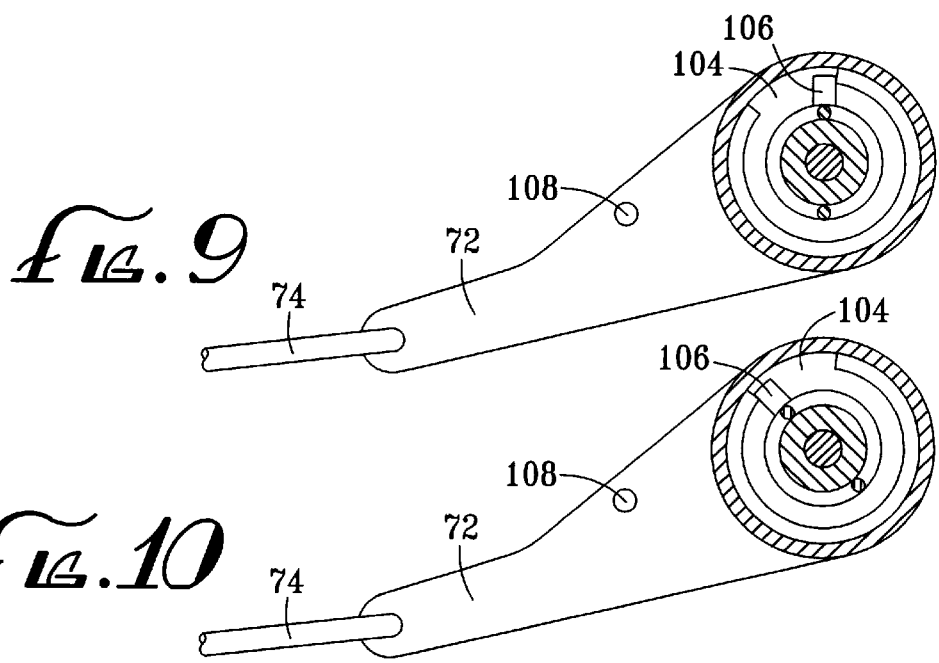
FIG. 9 is a side view, in partial cross-section, of actuation equipment illustrated in FIG. 7, taken along line 8—8.
Figure 10:
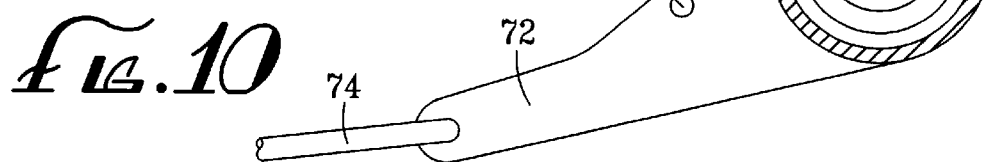
FIG. 10 is a side view, in partial cross-section, of actuation equipment illustrated in FIG. 7, taken along line 8—8.

As illustrated in FIGS. 8–10, as the first actuation arm 72 is rotated in a counterclockwise fashion (by operation of the actuation member 68 whose lower end is rotatably attached to the first actuation arm 72 at aperture 108), the housing 90 is rotated a like amount. Such rotation of the housing 90 rotates the first end 93 of the spring 70. However, under normal filtering operation, fluid pressure within the backwash valve body 58 is quite strong, so the connection rod 100 cannot rotate. Thus, as the first actuation arm 72 is moved from the position illustrated in FIG. 8 to the position illustrated in FIG. 9, torsional pressure is built up within the spring 70. Thereafter, as the first actuation arm 72 is further rotated in a counter-clockwise direction, one end of the C-ring applies direct mechanical pressure to the connection heel 106. Further movement of the first actuation arm 72 thus forces the rotation of the connection heel 106 and, therefore, the rotation of the connection rod 100. As soon as the connection rod 106 begins to move, the backwash valve 26 is opened, balancing the fluid pressure on the backwash valve element 62. Such balancing instantly releases all fluid pressure formerly tending to seal the backwash valve element 62 against the backwash valve seat 60. The biasing pressure built up within the spring 70 is then free to rotate the inlet valve 20 and the backwash valve element 62 in a sudden counter-clockwise movement as illustrated in FIG. 10.

As noted above, in normal operation, the filter unit 12 of the invention 10 is operated to filter a liquid fluid by passing the fluid through the inlet valve 12, through the backwash valve body 58, through the filter cartridge 42 and out through the outlet 18 via the outlet valve 22. The material filtered out of the fluid is trapped within the filter cartridge 42. Preferably, the differential pressure across the filter cartridge 42 is monitored by a pressure controller 86. When the filtered material accumulates within the filter cartridge 42 to such an extent that the differential pressure across the filter cartridge 42 exceeds a preselected set point, the pressure controller 86 sends a signal which causes the block valve 84 to open, allowing pressurized water to flow into the second hydraulic line 80. The three-way valve 82 is positioned to allow the pressurized water to flow from the second hydraulic line 80 to the first hydraulic line 78, whereupon the pressurized water pressurizes the hydraulic actuator 76.

Pressure within the actuator 76 causes the actuation member 68 to travel downwardly against the counter-acting pressure of the actuator spring 85.

The downward travel of the actuation member 68 causes the first actuation arm 72 to rotate in a counter-clockwise direction. Such counter-clockwise movement of the first actuation arm 72 causes the link rod 74 to rotate the second actuation arm 75 in a clockwise direction to begin closing the inlet valve 20.

As the first actuation arm 72 rotates in a counter-clockwise direction, tension is placed on the torsional spring 70 which urges the inlet valve 20 to close. However, the tension on the torsional spring 70 is preselected to approach, but to not exceed, the force necessary to overcome the fluid pressure within the backwash valve body 58 urging the backwash valve member 62 to remain tightly sealed in the fully-closed position. The initial movement of the actuation member 68 continues until contact is made between the C-ring 102 and the contact heel 106. At this point, the outlet valve 22 of the filtration unit 12 is fully-closed and maximum tension is applied to the torsional spring 70 urging the inlet valve 20 to close.

Thereafter, the actuator 76 causes the actuation member 68 to travel downwardly beyond its initial movement. In such travel, the C-ring 102 and the contact heel 106 are in direct connection resulting in a direct connection between the actuation member 68 and the inlet valve 20. Accordingly, the further travel of the actuation member 68 forces the inlet valve 20 towards its fully-closed position. Because the backwash valve member 62 is mechanically attached to the inlet valve 20 via the plate 66, the backwash valve member 62 is forced out of a sealing relationship with the backwash valve seat 60. As soon as the backwash valve member 62 is dislodged from the backwash valve seat 60, the fluid pressure acting on the back side of the backwash valve member 62 is immediately balanced by like pressure on the opposite side. Accordingly, the potential energy built up in the torsional spring 70 is suddenly free to act upon the inlet valve 20. The inlet valve 20 is quickly slammed shut and the backwash valve member 62 is just as quickly opened to its maximum extent.

This very sudden opening of the backwash valve 26 causes an explosive-like surge of backwashing fluids from the reservoir 38 (backwards) through the filter cartridge 42 and out through the backwash valve 26 discharge to the zone. Because the backwash valve 26 is a non-outlet side linearly actuated valve, the outflow of backwashing fluids does not have to make any abrupt changes of direction. Thus, the flow of backwashing fluids explodes through the backwashing valve 26 with maximum force. Because of this, the present invention provides an extremely efficient backwashing system.

Having thus described the invention, it should be apparent that numerous structural modifications and adaptations may be resorted to without departing from the scope and fair meaning of the instant invention as set forth hereinabove and as described hereinbelow by the claims.

What is claimed is:

1. In a filtering apparatus comprising: (i) a filter having an inlet for a pressurized fluid to be filtered, and an outlet for the filtered fluid; (ii) an inlet valve and an outlet valve respectively for said filter inlet and said filter outlet each capable of cycling between an open position and a fully-closed position; (iii) means providing a reversed flow backwash connection through the filter from a source of pressurized filtered fluid to discharge zone, when said inlet and outlet valves are closed; and (iv) a non-outlet side backwash valve in said reversed flow connection normally urged by fluid pressure to a closed position and having actuator means operable to effect a quick opening of the valve whereby to produce an explosive surge in the backwash flow to dislodge accumulated filtered matter in the filter, the improvement being that said non-outlet side backwash valve is a rotating valve, the backwash valve being attached to the inlet valve such that (i) the backwash valve is fully closed when the inlet valve is open, and (ii) rotation of the inlet valve towards its fully-closed position opens the backwash valve.

2. The filtering apparatus of claim 1, wherein the inlet valve is a butterfly valve.

3. The filtering apparatus of claim 1, which includes a closed reservoir except for a bottom connection with the filter outlet upstream of said outlet valve, whereby, with the outlet valve closed and the inlet valve open, filtered fluid will be forced into said reservoir to compress entrapped air therein, and upon closure of the inlet valve, provide said source of pressurized filtered fluid.

4. The filtering apparatus of claim 1, in which the filter comprises:

(a) an upright cylindrical housing with top and bottom end walls, each having an opening, the opening in the bottom end wall being in communication with the filter outlet;

(b) a filter member of tubular configuration in said housing with its ends respectively in sealed relation to said end walls and with an axial passage thereof having its ends respectively in communication with said openings, and with its outer surrounding surface coacting to form with the adjacent wall of the housing an annular space having communication with the inlet valve;

wherein a closed reservoir extends above said housing, said reservoir having an opening at its bottom end in direct communication with the opening in said top end wall, whereby, with the outlet valve closed and the inlet valve open, filtered fluid will be forced into said reservoir to compress the entrapped air therein, and upon closure of the inlet valve, provide said source of pressurized filtered fluid for the backwashing operation.

5. The filtering apparatus of claim 4, in which the actuator means of the backwash valve comprises:

(a) an actuation member movable in response to an applied pressurized fluid;

(b) means interconnecting said actuation member and said backwash valve including (i) a spring compressible in response to a predetermined initial movement of said actuation member, and (ii) means operative at the end of said initial movement to establish a direct connection with said backwash valve, whereby further movement of the actuation member after said initial movement operates to initially unseat said backwash valve and permit the compressed spring to quickly move the backwash valve to its fully-open position.

6. The filtering apparatus of claim 5 wherein the spring is a torsional spring.

7. The filtering apparatus of claim 5 wherein the actuation member is further connected to the outlet valve, such that the initial movement of the actuation member causes the outlet valve to go to its fully-closed position.

8. The filtering apparatus of claim 7 wherein the actuation member is mechanically linked to the outlet valve, such that the initial movement of the actuation member causes a linking rod to rotate the outlet valve from an open position to a fully-closed position.

9. The filtering apparatus of claim 5 further comprising a hydraulic actuator capable of periodically applying a pressurized fluid to the actuation member so as to move the actuation member.

10. The filtering assembly of claim 9 further comprising a first hydraulic line disposed in fluid tight communication with the actuator, a second hydraulic line disposed in fluid tight communication with a source of pressurized fluid, a block valve disposed within the second hydraulic line and a three-way valve capable of alternatively interconnecting (i) the first hydraulic line in fluid tight communication with the second hydraulic line, and (ii) the first hydraulic line in fluid tight communication with an exhaust zone, such that the actuator can be filled with pressurized fluid by opening the block valve and directing pressurized fluid from the second hydraulic line to the first Hydraulic line via the three-way valve, and such that pressurized fluid can thereafter be drained from the actuator to the exhaust zone through the first hydraulic line via the three-way valve.

11. A method for backwashing a filter apparatus wherein the filter apparatus comprises (i) a filter having an inlet for a pressurized fluid to be filtered, and an outlet for the filtered fluid; (ii) an inlet valve and an outlet valve respectively for said filter inlet and said filter outlet each capable of cycling between an open position and a fully-closed position; (iii) means providing a reversed flow backwash connection through the filter from a source of pressurized filtered fluid to a point of discharge, when said inlet and outlet valves are closed; and (iv) a non-outlet side linearly actuated backwash valve in said reversed flow connection normally urged by fluid pressure to a closed position and having actuator means operable to effect a quick opening of the valve whereby to produce an explosive surge in the backwash flow to dislodge accumulated filtered material in the filter;

wherein the filter comprises (i) an upright cylindrical housing with top and bottom end walls, each having an opening, the opening in the bottom end wall being in communication with the filter outlet; (ii) a filter member of tubular configuration in said housing with its ends respectively in sealed relation to said end walls and with an axial passage thereof having its ends respectively in communication with said openings, and with its outer surrounding surface coacting to form with the adjacent wall of the housing an annular space having communication with the inlet valve, wherein a closed reservoir extends above said housing, said reservoir having an opening at its bottom end in direct communication with the opening in said top end wall, whereby, with the outlet valve closed and the inlet valve open, filtered fluid will be forced into said reservoir to compress the entrapped air therein, and upon closure of the inlet valve, provide said source of pressurized filtered fluid for the backwashing operation;

and wherein the actuator means of the backwash valve comprises (i) an actuation member movable in response to an applied pressurized fluid; (ii) means interconnecting said actuation member and said backwash valve including (A) a spring compressible in response to a predetermined initial movement of said actuation member, and (B) means operative at the end of said initial movement to establish a direct connection with said backwash valve, whereby further movement of the actuation member after said initial movement operates to initially unseat said backwash valve and permit the compressed spring to quickly move the backwash valve to its fully-open position;

the method comprising:
(a) closing the outlet valve to cause internal pressure to build within the closed reservoir;
(b) initiating an initial movement of the actuation member which comprises the spring to thereby apply biasing pressure on the inlet valve, said biasing pressure being less than the pressure required to rotate the outlet valve on the filter outlet to its fully-closed position;
(c) mechanically applying additional pressure to the inlet valve until the backwash valve is caused to open, whereupon the biasing pressure exerted by the spring quickly closes the inlet valve and further opens the backwash valve to produce an explosive surge of backwash flow from the closed reservoir, through the filter medium and out through the opened backwash valve.

12. The method of claim 11 wherein the initiating of the initial movement in step (b) is made hydraulically in response to a controller monitoring the differential pressure across the filter medium.

* * * * *